United States Patent [19]

Pittinger, Jr.

[11] 4,187,598
[45] Feb. 12, 1980

[54] FILAMENT WOUND PERFORATE PLATE SYSTEM

[76] Inventor: Charles B. Pittinger, Jr., 320 Cockeys Mill Rd., Reisterstown, Md. 21136

[21] Appl. No.: 813,351

[22] Filed: Jul. 6, 1977

Related U.S. Application Data

[62] Division of Ser. No. 587,648, Jun. 17, 1975, Pat. No. 4,035,915.

[51] Int. Cl.² .................. B23P 11/00; B26B 27/00; A01D 55/18
[52] U.S. Cl. .......................... 29/513; 30/347; 56/12.7; 56/295; 29/159.02
[58] Field of Search .............. 30/DIG. 5, 347, 296 R, 30/276, 115, 116; 29/513, 159.02, 526, 433, 241; 56/12.7, 295; 242/51, 50

[56] References Cited

U.S. PATENT DOCUMENTS

| | | | |
|---|---|---|---|
| 1,296,402 | 3/1919 | Kahn | 29/513 |
| 1,467,478 | 9/1923 | Hayes | 29/159.02 |
| 2,852,182 | 9/1958 | Wilken | 29/513 |
| 3,708,967 | 1/1973 | Geist et al. | 56/295 |
| 3,826,068 | 7/1974 | Ballas et al. | 56/12.7 |
| 4,054,992 | 10/1977 | Ballas et al. | 56/295 |

FOREIGN PATENT DOCUMENTS

| | | | |
|---|---|---|---|
| 283713 | 4/1915 | Fed. Rep. of Germany | 242/50 |
| 705098 | 11/1930 | France | 29/513 |

Primary Examiner—Milton S. Mehr
Attorney, Agent, or Firm—John P. McClellan, Sr.

[57] ABSTRACT

A filament-bearing plate or disk system for cutting grass and the like in which the filament is wound upon later-closed serrations in the disk periphery rather than passed through a succession of holes in the disk periphery; embodiments of the invention have respectively resilient, malleably deformable, and rotationally positionable aperture closing, and a ring closure.

13 Claims, 15 Drawing Figures

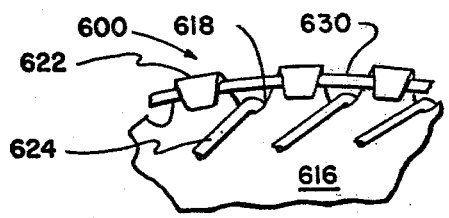
FIG. 6
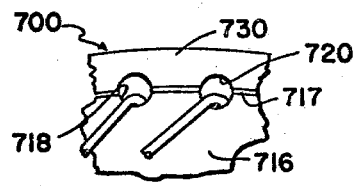
FIG. 7
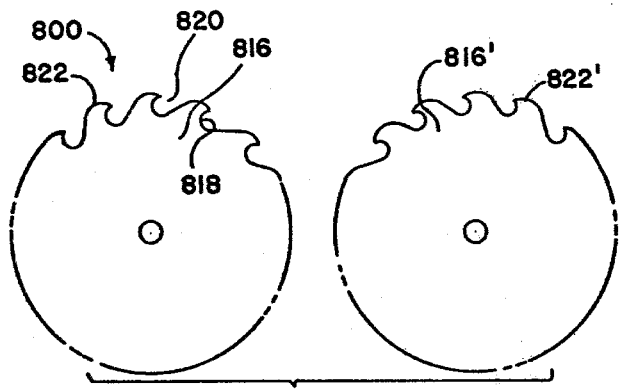
FIG. 8a
FIG. 8b
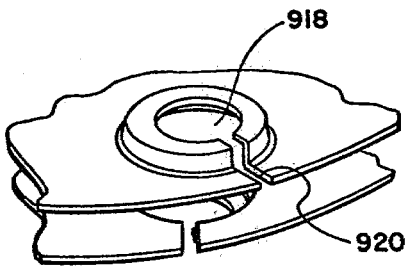
FIG. 9a
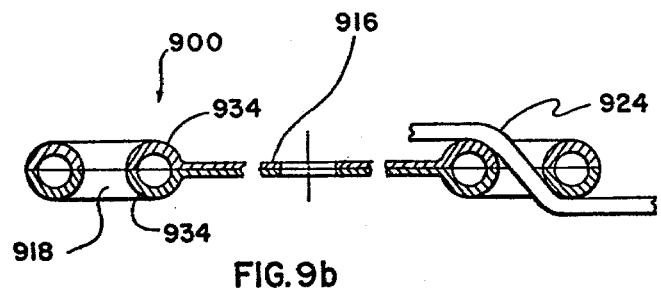
FIG. 9b

FILAMENT WOUND PERFORATE PLATE SYSTEM

Cross reference is made to my co-pending application for U.S. Pat. Ser No. 587,648, filed June 17, 1975 now U.S. Pat No. 4,035,415 issued July 9, 1977 for FILAMENT WOUND PERFORATE PLATE SYSTEM of which the present application is a division and further to the application which matured into U.S. Pat No. 3,895,440 granted Jan. 22, 1975 for Disk For Filament Trimmer and the application which matured into U.S. Pat No. 3,928,911 granted Dec. 30, 1975 for Hollow-Shaft Feed Filament Trimmer.

This invention relates generally to filament cutters for cutting grass and the like, and specifically to automatic-filament-feed cutter heads of the type described.

U.S. Pat. No. 3,895,440 discloses a novel cutter head which swings a terminal length of filament as a cutter as it operationally rotates, and which upon parting of that terminal length of filament as result of wear or breakage during operation automatically deploys a replacement length, and so on, deploying additional lengths as needed.

Structure previously disclosed by me for the purpose includes a disk or plate with a circular series of perforations through which the filament is threaded in a predetermined serial mode.

A principal object of the present invention is to provide for faster mounting of filament in disk structure by having a continuous length of filament wound over a serrated plate periphery, rather than threaded through holes.

Further objects are to provide for adjustment of aperture size and configuration to suit particular needs such as filament sizes.

The above advantages and objects of this invention will become more readily understood upon examination of the following description, including the Figures in which like reference numerals refer to like parts:

FIG. 6 is a top plan view of a fragment of a sixth embodiment;

FIG. 7 is a top plan view of a fragment of a seventh embodiment;

FIGS. 8a and 8b are respectively an exploded view and a view assembled of an eighth embodiment; and FIGS. 9a and 9b are respectively an isometric fragmentary detail during assembly and a side elevation in section after assembly of a ninth embodiment.

Figure 1A:
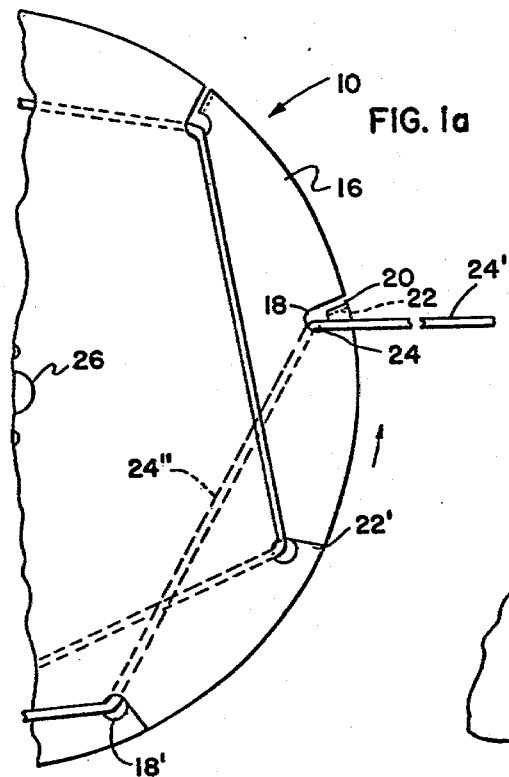
FIGS. 1a, 1b and 1c are respectively a top plan, a side elevation, and a radial section, showing fragmentary details of a first embodiment of the invention.
Figure 1B:
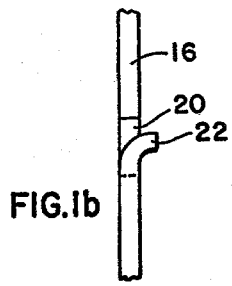
Figure 1C:
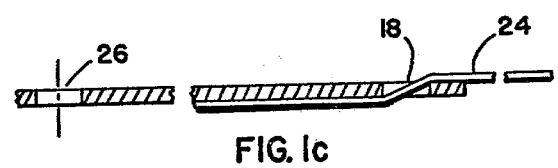

FIG. 1a, 1b and 1c illustrate an embodiment 10, showing rim of a disk or plate 16 which has a plurality of apertures 18 or filament wind-over areas around the periphery, and a slot or opening 20 passing outward from the aperture through the periphery. An element movable to close the slot is provided as follows. A portion of the material, which may be mild steel, forms a bent tab 22 bounding the slot on one side. After an intermediate portion of the filament 24 is wound into the aperture or passes radially into the aperture, the tab is bent into the plane of the disk, effectively closing the aperture as at 22′, forming a smooth periphery and preventing the terminal length of the filament 24′, if adjacent, from passing radially out of the aperture on rotation of the disk about the center 26, when the terminal length will swing beyond the periphery as a cutting length. When wear and stress eventually part the filament at the aperture, a new terminal length 24″ swings outward as a cutting length from another aperture 18′ in accordance with principles set out in my above referenced prior disclosure.

Figure 2:
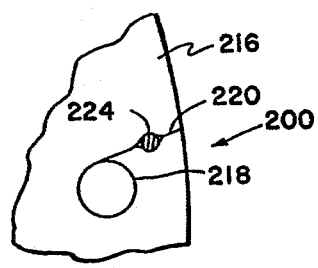
FIGS. 2 and 3 are top plan fragmentary details of a second and a third embodiment.

FIG. 2 illustrates an embodiment 200 having a self-sealing slit 220 through the periphery into the aperture 218. Material of the disk 216 is chosen to be sufficiently resilient to pass the filament 224, shown in section, under winding pressure, resealing behind it. Polypropylene or other resilient material can be used for the purpose, and the slit can be heat sealed or welded after winding, if desired.

Figure 3:
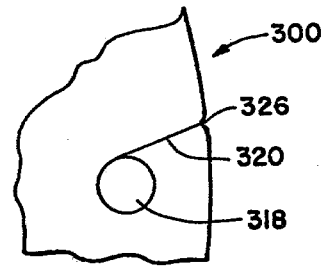

FIG. 3 shows an embodiment 300 similar to the preceding Figure except that the slit widens outwardly at the periphery of the disk, facilitating passing the filament into the aperture through the recess 326.

Figure 4A:
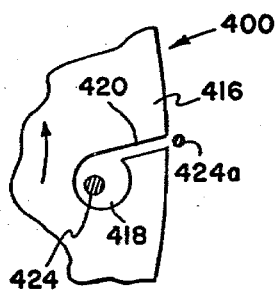
FIGS. 4a and 4b are top plan fragmentary details of a fourth embodiment and a variation thereon.

FIG. 4a illustrates an embodiment 400 with a fixed-width slot 420 through the periphery of the disk 416 connecting with the aperture 418. Resiliently deformable filaments such as "Nylon" monofilament can be stretched or otherwise resiliently deformed to reduce the cross-section locally as at 424a, received in and passed through the slot which is made to be too narrow for the unstressed filament to pass, and then, when in the aperture, relaxed, so that the filament is prevented from passing outward through the slot by the restoration of full diameter as at 424.

Figure 4B:
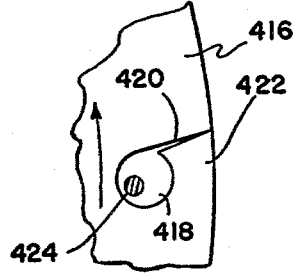

FIG. 4b indicates that disk structure 416 similar to that of the preceding Figure can be bent in-plane at 422 to close the slot if desired, regardless of whether the slot is initially larger or smaller than the filament 424, and regardless of filament characteristics. Circularity of the aperture (preferred embodiments) contributes to low-stress in-plane bending of the disk structure.

In all the above embodiments, the opening through the periphery communicating with the aperture is preferably at an angle to a radius therethrough and tangential to the aperture. If the disk has a preferred direction of rotation (arrows) then the outward inclination of the opening is preferably in the direction of the preferred direction of rotation. These arrangements provide double assurance that the filament will be smoothly and positively retained under the variables of operation, since the filament is never aligned with the opening, but instead swings radially outward, or slightly behind the radial position, because of cutting resistance and air resistance. In either case the filament lies over a solid portion of the disk.

Figure 5A:
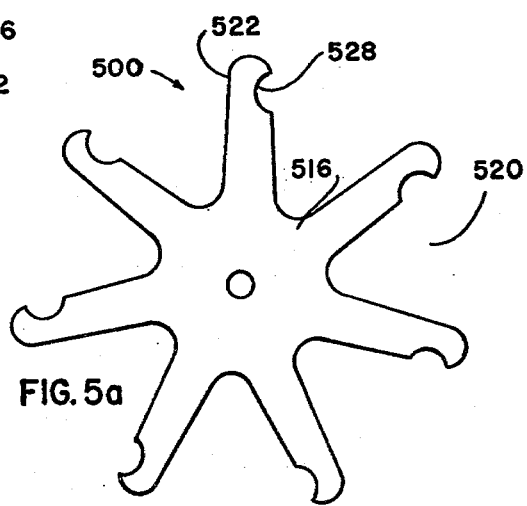
FIGS. 5a and 5b are respectively a top plan view of a fifth embodiment and a top plan fragmentary detail thereof at a later stage of manufacture.

FIG. 5a illustrates a starfish-like disk structure 516 in a preliminary stage of manufacture. Each of the arms 522 has a lateral relief 528 corresponding to that of the other arms outward of the apertures, as part of the opening 520 between the arms. Material is preferably mild steel. Function of the arms is shown in the next Figure.

Figure 5B:
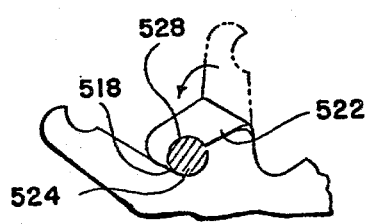

FIG. 5b indicates how the arms 522 of the preceding Figure can be inwardly bent or folded over themselves, toward the plane of the disk and laterally, overlapping and closing adjacent opening, with the contour of the relief 528 forming a continuation of the contour of the proximate aperture 518.

FIG. 6 illustrates an embodiment 600 somewhat similar to that of the previous Figure, but with the arm ends 622 being movable elements folded over a ring 630, holding the ring concentric with the disk center, and capturing the filament 624 in the apertures 618. The ring may also be held in place by welding. A ring on each side of the disk may also be supplied.

FIG. 7 illustrates an embodiment 700 with a ring 730 having recesses 720 in the inner circumference corresponding to the disk apertures 718 so that they together form closed contoured apertures. The ring and the disk may be welded or cemented to unite the ring with the circumference of the disk, which it fits, as at 717.

FIG. 8 illustrates an embodiment 800 in which the disk 816 has a serrated periphery on which the filament is wound. The teeth 822 are formed by inclined openings 820 through the periphery connecting with the apertures 818. Following winding, a matching movable element 816', which may be an identical disk reversed and coaxially mounted so that the teeth 822' incline in the opposite direction, is moved relative to the disk, such as by relative rotation, so that the teeth close the openings outwardly of the apertures.

FIG. 8b shows the finished result. Restringing or rewinding is easily accomplished by loosening the shaft nut, clamp, or any other common fastening device 832 which may be employed to hold the relative position of the parts, and rewinding the disk, following which the co-acting element is again assembled.

Size of the apertures is adjustable for various size filaments to an extend depending on to what degree the coaxial parts are rotated relative to each other.

FIGS. 9a and 9b show an embodiment 900 similar to that of the preceding Figure, in which identical disks have apertures surrounded by pressed or cast integral hemi-toroidal structure 934 through which openings 920 through the periphery pass at an angle to radii passing therethrough. The openings may be radial to the apertures (but not to the disks 916) as shown. In any case the openings are narrow relative to the diameters of the apertures and the openings between apertures so that when the plates are placed face-to-face, filaments cannot be strung because they cannot pass through the openings which, being inclined to the disk radius, cannot be congruent even through the apertures are congruent. This requires axial separation of the disks for stringing or winding access to the apertures 918. The toroidal structure on assembly of the plates or disks form a continuously curved structure for the filament 924.

Obviously many modifications and variations of the present invention are possible in light of the above teachings. It is, therefore, to be understood that within the scope of the appended claims the invention may be practiced otherwise than as specifically described.

I claim:

1. The method of manufacturing a vegetation filament-trimmer plate, comprising the steps: winding successive intermediate portions of a filament across a plurality of temporary openings in the periphery of a plate, and causing the temporary openings to be closed to outward passage of the filaments therefrom after the filament is wound therein.

2. The method as recited in claim 1, wherein the step of causing the temporary openings to be closed to outward passage of the filaments therefrom is by means of moving portions of the plate at the respective temporary openings.

3. The method of manufacturing a vegetation filament-trimmer plate, comprising the steps:
   (i) winding successive intermediate portions of a filament over and around the periphery of a plate through a plurality of temporary openings in the periphery of the plate;
   (ii) closing the plurality of temporary openings to outward passage of the windings therefrom by surrounding the plurality of temporary openings with a member; while
   (iii) leaving a free end of the filament extending from the plate; thereby manufacturing a vegetation filament-trimmer plate.

4. The method of manufacturing a vegetation filament-trimmer plate rotatable about the center thereof for trimming operations, comprising the steps:
   (i) winding a plurality of intermediate portions of a continuous length of filament around a filament trimmer plate over the periphery of said filament trimmer plate;
   (ii) leaving a terminal length of the continuous length of filament extensible from the filament trimmer plate as a cutting length, and
   (iii) retaining said windings at the filament trimmer plate with structure at each winding causing successive windings to part in sequence under wear and stress on said rotation of the filament trimmer plate about said center thereof during trimming operations and thereby releasing successive terminal lengths of said continuous length of filament as cutting lengths.

5. The method of manufacturing a vegetation filament-trimmer plate comprising the steps:
   (a) winding successive intermediate portions of a filament across a plurality of openings of a plate;
   (b) leaving a terminal length of the filament extensible as a vegetation-trimming length, and
   (c) causing the openings to be closed to outward movement of the filament intermediate portions after the filament is wound thereon; thereby manufacturing a vegetation filament-trimmer plate.

6. The method of manufacturing a vegetation filament trimmer plate comprising the steps: winding a continuous length of filament serially over a plurality of filament wind-over areas formed in a plate periphery, leaving a free end of the continuous length of filament terminal-end extensible from the plate, and retaining the continuous length of filament to the plate selectively at said wind-over areas by means radially outward of the continuous length of filament.

7. The method of making a vegetation filament cutter head, comprising the steps: juxtaposing first and second plates, winding filament over the periphery of at least one of the plates, and retaining the filament wound by relatively moving said plates.

8. The method of claim 7, wherein said relatively moving comprises rotary movement.

9. The method of making a vegetation filament-trimmer cutter head comprising the steps: winding a filament in successive openings too small to receive the filament, in the periphery of a plate by temporarily widening the openings, and causing the openings to be closed to outward passage of the filament by permitting the openings to close behind the filament after passage of the filament thereinto, thereby making a vegetation filament-trimmer cutter head.

10. The method of making a vegetation filament-trimmer cutter head comprising the steps: reducing the size of intermediate portions of the filament by resiliently deforming the intermediate portions of the filament to pass in succession into plural openings in a plate periphery, and causing the openings to be closed to outward passage of the filament by permitting the filament to relax to undeformed size after passage into said openings.

11. The method of manufacturing a filament wound plate, comprising the steps: winding successive intermediate portions of a filament across a plurality of openings of a plate, and causing the openings to be closed to outward passage of the filament after the filament is wound therein.

12. The method of manufacturing a vegetation filament trimmer plate, comprising the steps:
  (i) serially winding successive intermediate portions of a continuous filament over a plurality of openings in the periphery of a plate,
  (ii) leaving a terminal length of the continuous filament extensible from one of said plurality of openings as a cutting length, and
  (iii) preventing outward passage of the intermediate portions of the continuous filament from the plurality of openings in the periphery of the plate by means on the plate outward of the continuous filament.

13. The method of manufacturing a vegetation filament trimmer plate, comprising the steps:
  (i) winding a plurality of intermediate portions of a continuous filament around a filament trimmer plate;
  (ii) leaving a terminal length of the continuous filament extensible from the filament trimmer plate as a cutting length; and
  (iii) confining each said winding at the filament trimmer plate against outward movement from the filament trimmer plate.

* * * * *